US012097395B2

(12) United States Patent
Bouchard et al.

(10) Patent No.: US 12,097,395 B2
(45) Date of Patent: Sep. 24, 2024

(54) CARTRIDGE WEIGHT MONITORING

(71) Applicant: Carrier Corporation, Palm Beach, FL (US)

(72) Inventors: Karen K. Bouchard, Ayer, MA (US); Thomas C. Kjellman, Uxbridge, MA (US)

(73) Assignee: KIDDE-FENWAL, LLC, Ashland, MA (US)

(*) Notice: Subject to any disclaimer, the term of this patent is extended or adjusted under 35 U.S.C. 154(b) by 825 days.

(21) Appl. No.: 16/948,929

(22) Filed: Oct. 6, 2020

(65) Prior Publication Data

US 2021/0138286 A1 May 13, 2021

Related U.S. Application Data

(60) Provisional application No. 62/934,612, filed on Nov. 13, 2019.

(51) Int. Cl.
*A62C 37/50* (2006.01)
*A62C 3/00* (2006.01)

(52) U.S. Cl.
CPC .............. *A62C 37/50* (2013.01); *A62C 3/006* (2013.01)

(58) Field of Classification Search
CPC .......... A62C 37/50; A62C 3/006; A62C 13/78
USPC .............................................................. 177/1
See application file for complete search history.

(56) References Cited

U.S. PATENT DOCUMENTS 8,378,834 B1 * 2/2013 Glaub .................... A62C 3/006 169/56
8,678,101 B2 * 3/2014 Gatsonides ............ A62C 35/02 169/61
9,873,007 B2 * 1/2018 Al-Hebshi ............. A62C 35/10
9,993,673 B2 6/2018 Rousseau et al.
10,478,651 B2 * 11/2019 Moffa .................. G08B 29/145
10,695,600 B2 * 6/2020 Moffa .................... A62C 37/50
10,898,747 B2 * 1/2021 Moffa .................. G08B 29/145
10,926,119 B1 * 2/2021 Rousseau ............... A62C 13/74
11,241,599 B2 * 2/2022 Enk ........................ A62C 37/04

(Continued)

FOREIGN PATENT DOCUMENTS

CN 108295408 A 7/2018
EP 2658616 A1 11/2013

(Continued)

OTHER PUBLICATIONS

Extended European Search Report received for EP Application No. 20206506.6, mailed on Apr. 21, 2021, 7 Pages.

*Primary Examiner* — Jacques M Saint Surin
(74) *Attorney, Agent, or Firm* — Honigman LLP

(57) ABSTRACT

A cartridge monitoring assembly for detecting a weight of a cartridge, a fire suppression system for incorporating the same, and a method of detecting a weight of a cartridge installed within a fire suppression system are provided. The cartridge monitoring assembly includes a support bracket for securing a cartridge containing a pressurized gas to the cartridge monitoring assembly, and at least one weight sensor for detecting the weight of the cartridge. The cartridge monitoring assembly enables the comparison of the weight of a cartridge installed within the fire suppression system with a previously calculated full weight value to determine a weight variance of the cartridge installed within the fire suppression system.

19 Claims, 5 Drawing Sheets

(56) References Cited

U.S. PATENT DOCUMENTS

| | | | | | |
|---|---|---|---|---|---|
| 11,648,431 | B2 * | 5/2023 | Piech | A62C 35/023<br>169/61 |
| 2018/0169450 | A1 * | 6/2018 | Moffa | G08B 29/145 |
| 2019/0374803 | A1 * | 12/2019 | Ryczek | A62C 35/023 |
| 2022/0219031 | A1 * | 7/2022 | Prat | A62C 35/13 |

FOREIGN PATENT DOCUMENTS

| | | | | |
|---|---|---|---|---|
| KR | 1590612 | B1 | 2/2016 | |
| KR | 101721822 | B1 | 3/2017 | |
| WO | 20181123852 | | 6/2018 | |
| WO | 2019081793 | A1 | 5/2019 | |
| WO | WO-2019237056 | A1 * | 12/2019 | A62C 35/023 |

* cited by examiner

CARTRIDGE WEIGHT MONITORING

CROSS REFERENCE TO A RELATED APPLICATION

The application claims the benefit of U.S. Provisional Application No. 62/934,612 filed Nov. 13, 2019, the contents of which are hereby incorporated in their entirety.

BACKGROUND

Fire suppression systems for commercial cooking applications are often actuated by disposable cartridges that are filled with compressed gases, such as, for example, nitrogen or carbon dioxide. These disposable cartridges are used to pressurize the actuation line and open the valve(s) to allow the fire suppression agent to discharge. Without a fully pressurized disposable cartridge, the fire suppression system cannot discharge the fire suppression agent.

To ensure that the fire suppression system is ready to discharge the fire suppression agent in the event of a fire, standards bodies such as the National Fire Protection Association (NFPA) require testing and inspection of the fire suppression system semi-annually for commercial kitchens. To be prepared for the next test or potential fire, the disposable cartridges in the system need to be replaced following each discharge, as the disposable cartridges can only be used for one actuation. A current limitation of many fire suppression systems is the inability to know whether the disposable cartridge within the fire suppression system is fully pressurized and able to actuate the fire suppression system.

Accordingly, there remains a need for a cartridge monitoring assembly that enables one to know whether the disposable cartridge within the fire suppression system is fully pressurized and able to actuate the fire suppression system.

BRIEF DESCRIPTION

According to one embodiment, a fire suppression system is provided, which includes a cartridge for holding a pressurized gas, the cartridge operatively connected to a valve, and a monitoring assembly connected to the cartridge. The monitoring assembly includes a support bracket for securing the cartridge to the monitoring assembly and at least one weight sensor for detecting a weight of the cartridge.

In accordance with additional or alternative embodiments, the fire suppression system further includes a controller to trigger a communication of a trouble condition when the monitoring assembly detects a weight variance greater than a threshold. This threshold may, in certain instances, be viewed as a weight loss threshold or weight variance threshold.

In accordance with additional or alternative embodiments, the threshold is determined based upon a minimum amount of pressurized gas needed to actuate the valve.

In accordance with additional or alternative embodiments, the pressurized gas comprises at least one of: carbon dioxide and nitrogen.

In accordance with additional or alternative embodiments, the fire suppression system further includes a cylinder for holding a fire suppression agent.

In accordance with additional or alternative embodiments, the fire suppression agent includes at least one of: sodium bicarbonate, potassium bicarbonate, and monoammonium phosphate.

In accordance with additional or alternative embodiments, the support bracket is in contact with the at least one weight sensor.

In accordance with additional or alternative embodiments, the at least one sensor is in contact with the valve.

In accordance with additional or alternative embodiments, the valve includes a piercing pin, the piercing pin positioned approximately central to the support bracket.

In accordance with additional or alternative embodiments, the valve and the cartridge are vertically oriented, with the cartridge positioned above the valve.

In accordance with additional or alternative embodiments, the valve and the cartridge are vertically oriented, with the cartridge positioned below the valve.

In accordance with additional or alternative embodiments, the valve and the cartridge are horizontally oriented.

According to another aspect of the disclosure, a cartridge monitoring assembly is provided. The cartridge monitoring assembly including a support bracket for securing a cartridge containing pressurized gas to the cartridge monitoring assembly for a pressurized gas triggering device, and at least one weight sensor for detecting a weight of the cartridge.

In accordance with additional or alternative embodiments, the at least one weight sensor includes at least one electrical weight sensor in contact with the support bracket of the monitoring assembly.

In accordance with additional or alternative embodiments, the at least one weight sensor includes at least one mechanical weight sensor connected to the support bracket of the monitoring assembly.

In accordance with additional or alternative embodiments, the at least one weight sensor includes at least one of: a spiral spring, a cantilever, a helical coil, a strain gauge, and a load cell.

In accordance with additional or alternative embodiments, the at least one weight sensor is in contact with a valve, the valve including a piercing pin positioned approximately central to the support bracket, the valve configured to release the pressurized gas when activated.

According to another aspect of the disclosure, a method for detecting a weight of a cartridge installed within a fire suppression system is provided. The method including, receiving from a monitoring assembly, at a controller, a weight of a cartridge installed within the fire suppression system, the cartridge holding a pressurized gas, comparing the weight of the cartridge with a previously calculated full weight value to determine a weight variance of the cartridge, and triggering a communication, with the controller, when the weight variance of the cartridge is greater than a threshold. This threshold may, in certain instances, be viewed as a weight loss threshold or weight variance threshold.

In accordance with additional or alternative embodiments, the threshold is between 2 and 30 grams.

In accordance with additional or alternative embodiments, the threshold is determined based upon a minimum amount of pressurized gas needed to actuate the valve.

In accordance with additional or alternative embodiments, the weight variance of the cartridge is caused, at least in part, by a leak of the pressurized gas.

In accordance with additional or alternative embodiments, the method further includes sending the communication to a panel, the panel configured to initiate an alarm, the alarm including at least one of: an audible alarm signal, a visual indicator, and a digital alarm signal.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Figure 1:
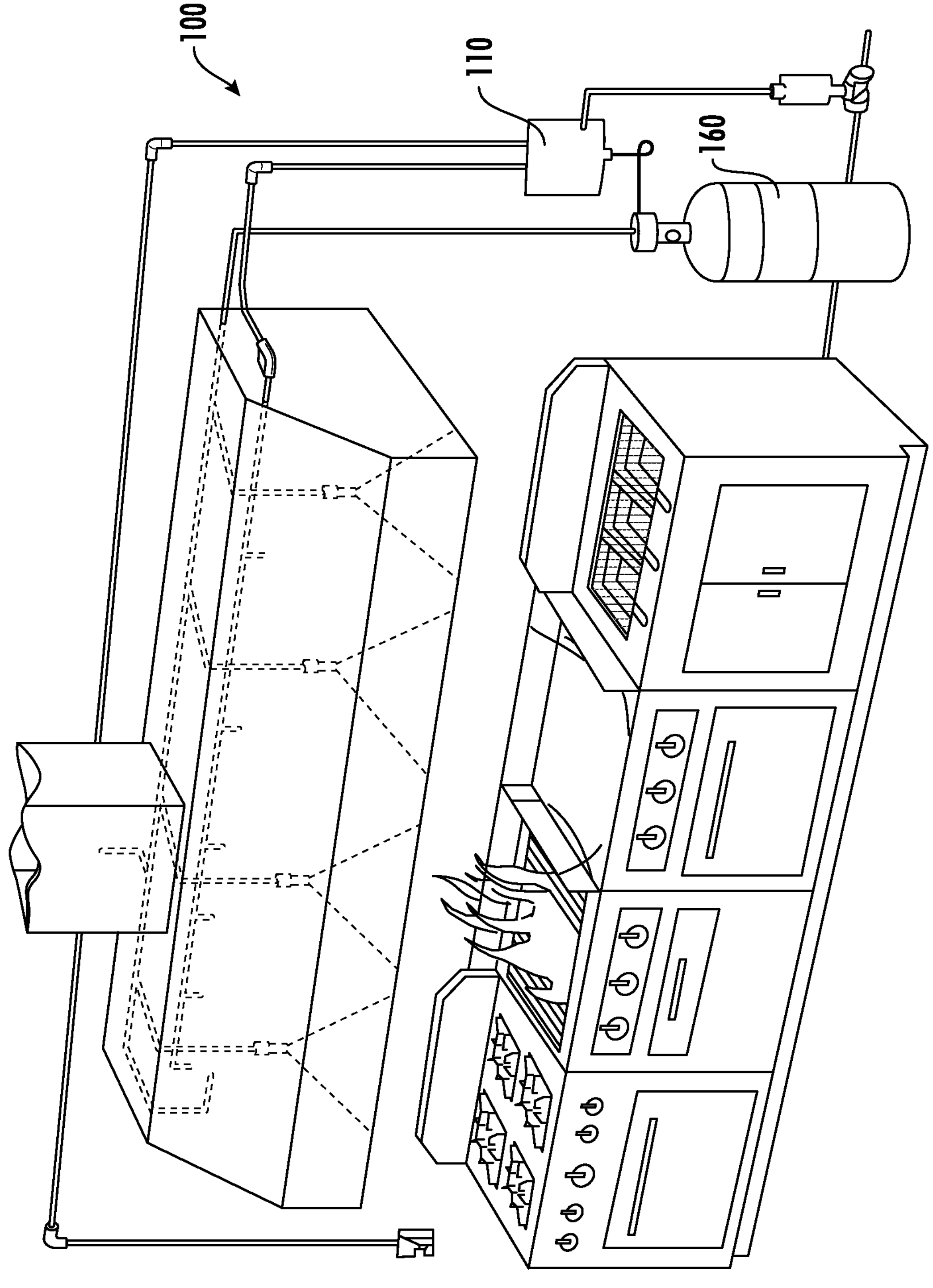
FIG. 1 is a schematic illustration of a fire suppression system in accordance with one aspect of the disclosure.

Fire suppression systems are often actuated by discharging one disposable cartridge. To be able to actuate the fire suppression system, the cartridge should contain a sufficient amount of pressurized gas to, through mechanisms described below, force open the valve(s) of the cylinder(s) holding the fire suppression agent; with the valve(s) open the fire suppression agent is discharged through the piping system and out of the nozzles to extinguish a detected fire risk. To ensure that the disposable cartridge is ready and able to actuate the fire suppression system a cartridge monitoring assembly, a fire suppression system for incorporating the same, and a method of detecting the weight of a cartridge installed within a fire suppression system are provided. The monitoring assembly provides this assurance by monitoring the weight of the cartridge.

The disposable cartridges within the systems can be either manually, via a pull station, mechanically, via fusible links and cables, or electrically, via a control panel, discharged. To discharge the disposable cartridge the seal of the cartridge needs to be punctured. To puncture the seal of the cartridge and release the pressurized gas a piercing pin may be used. The pressurized gas, once released from within the cartridge, is used to pressurize the actuation line and System Valve Actuators (SVA) mounted to the valve(s) of the cylinder(s) holding the fire suppression agent. Each SVA opens each respective valve by releasing a piston when pressurized. With the valve(s) open the fire suppression agent is discharged through the piping system and out of the nozzles. Without having enough pressurized gas to pressurize the actuation line and cause the SVA(s) to release the piston(s) opening the valve(s), the fire suppression agent cannot be discharged to extinguish a detected fire. As such it is critical that the disposable cartridge contains enough pressurized gas.

The cartridge monitoring assembly helps to ensure that the disposable cartridge contains sufficient gas to actuate the fire suppression system. Although the cartridge monitoring assembly is described in terms of being used with disposable cartridges, the cartridge monitoring assembly may, in certain instances, be used with refillable cartridges. In conjunction with what is described below, in certain instances, the cartridge monitoring assembly enables the continuous monitoring of the disposable cartridge, in the fire suppression system to alert or indicate when the disposable cartridge needs to be replaced. Continuous monitoring may, in certain instances, be achieved by periodically measuring the weight of the cartridge, for example, within every hour. Continuous monitoring may, in certain instances, be achieved by constantly measuring the weight of the cartridge.

Due to the inherent one use limit of the disposable cartridge, the cartridge is typically required to be replaced following the testing of the fire suppression system, following the use of the fire suppression system to extinguish a fire, or in the event that the pressurized gas within the cartridge leaks. The cartridge monitoring assembly helps to ensure that the fire suppression system is ready for use by monitoring the weight of the disposable cartridge. By monitoring the weight of the cartridge, instead of measuring pressure, which would create potential avenues for leaks, the cartridge monitoring assembly measures the weight of the cartridge allowing for the seal to remain closed until used.

Figure 2:
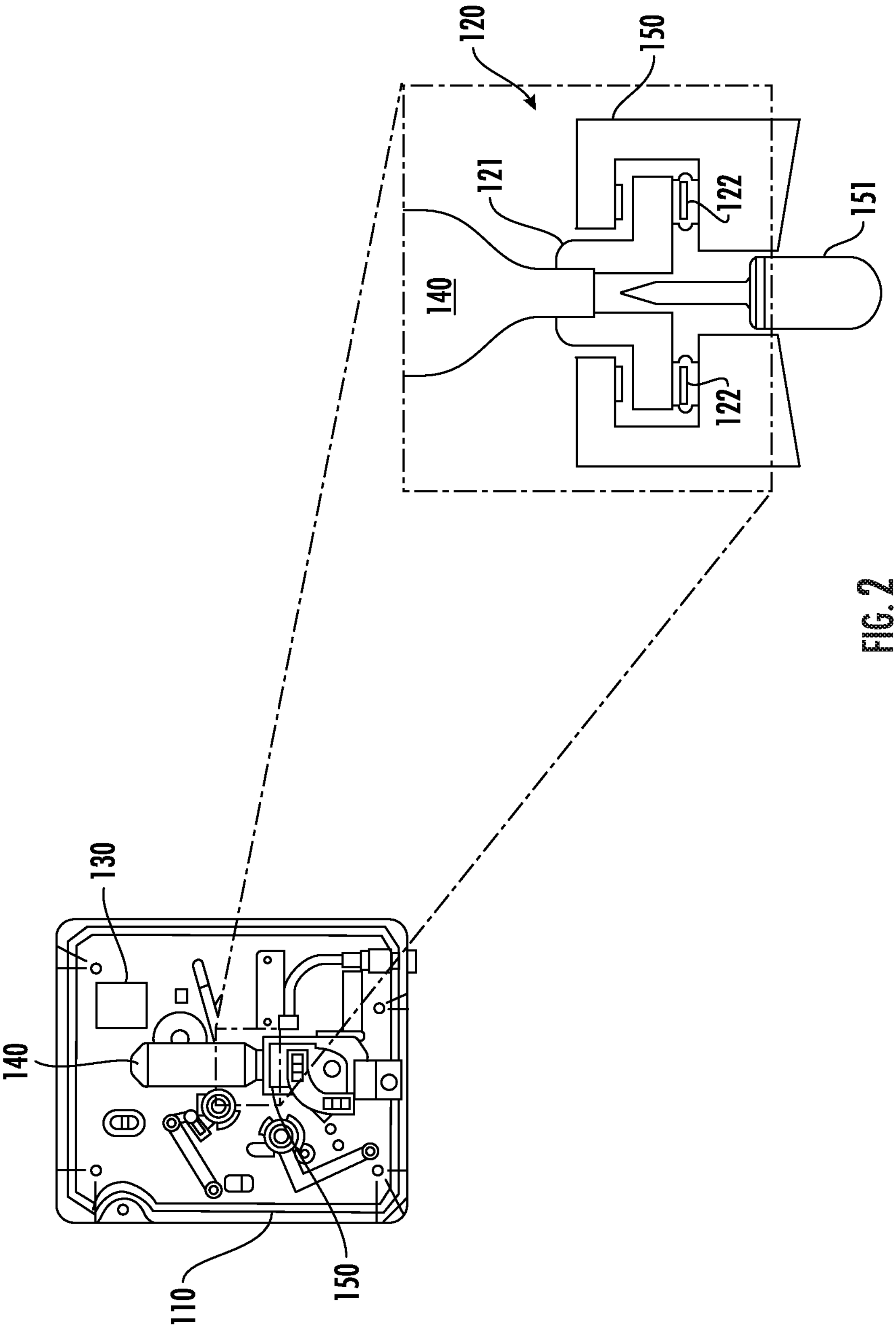
FIG. 2 is a perspective view of a cartridge monitoring assembly in accordance with one aspect of the disclosure.
Figure 3:
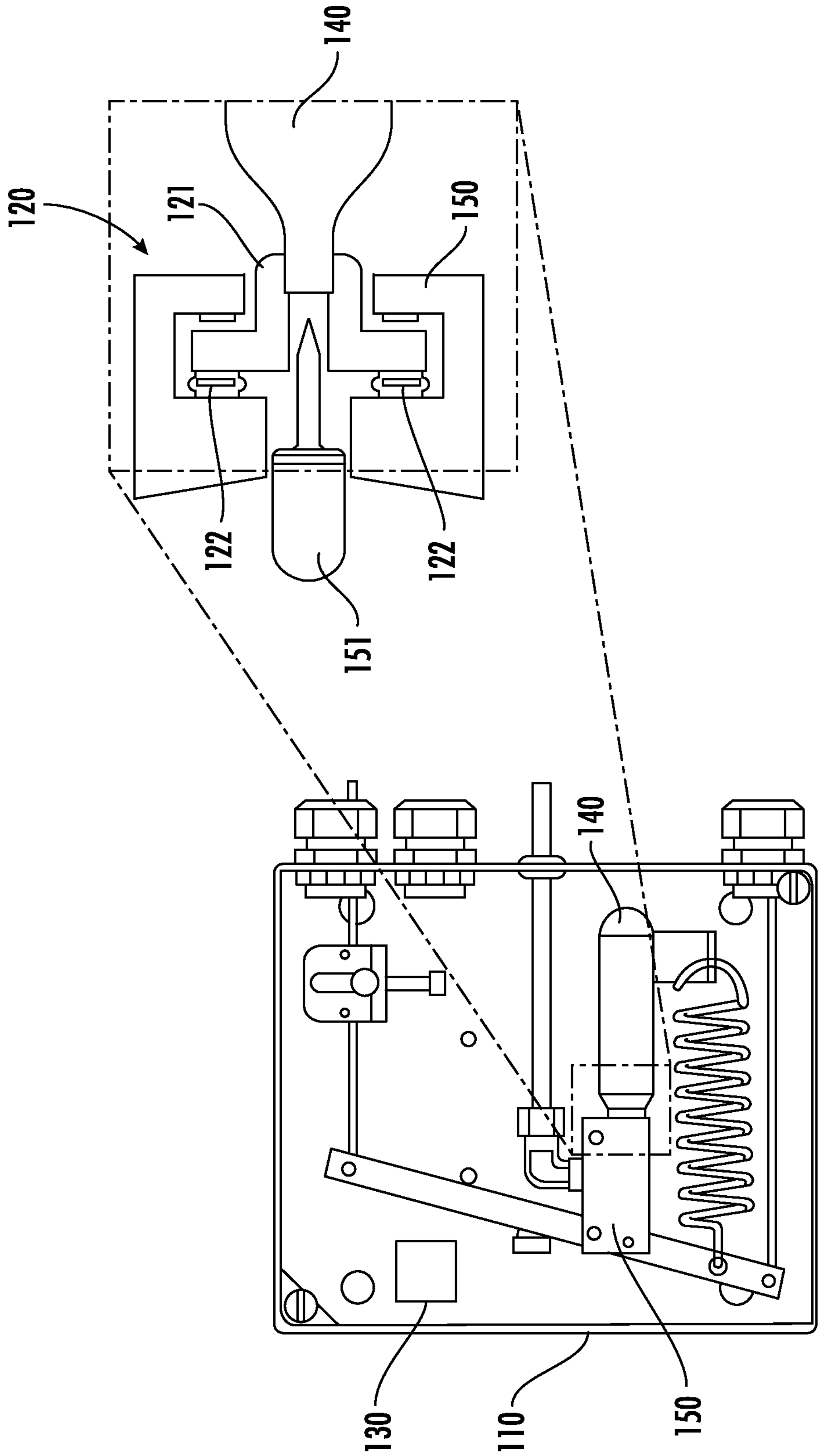
FIG. 3 is a perspective view of a cartridge monitoring assembly in accordance with one aspect of the disclosure.
Figure 4:
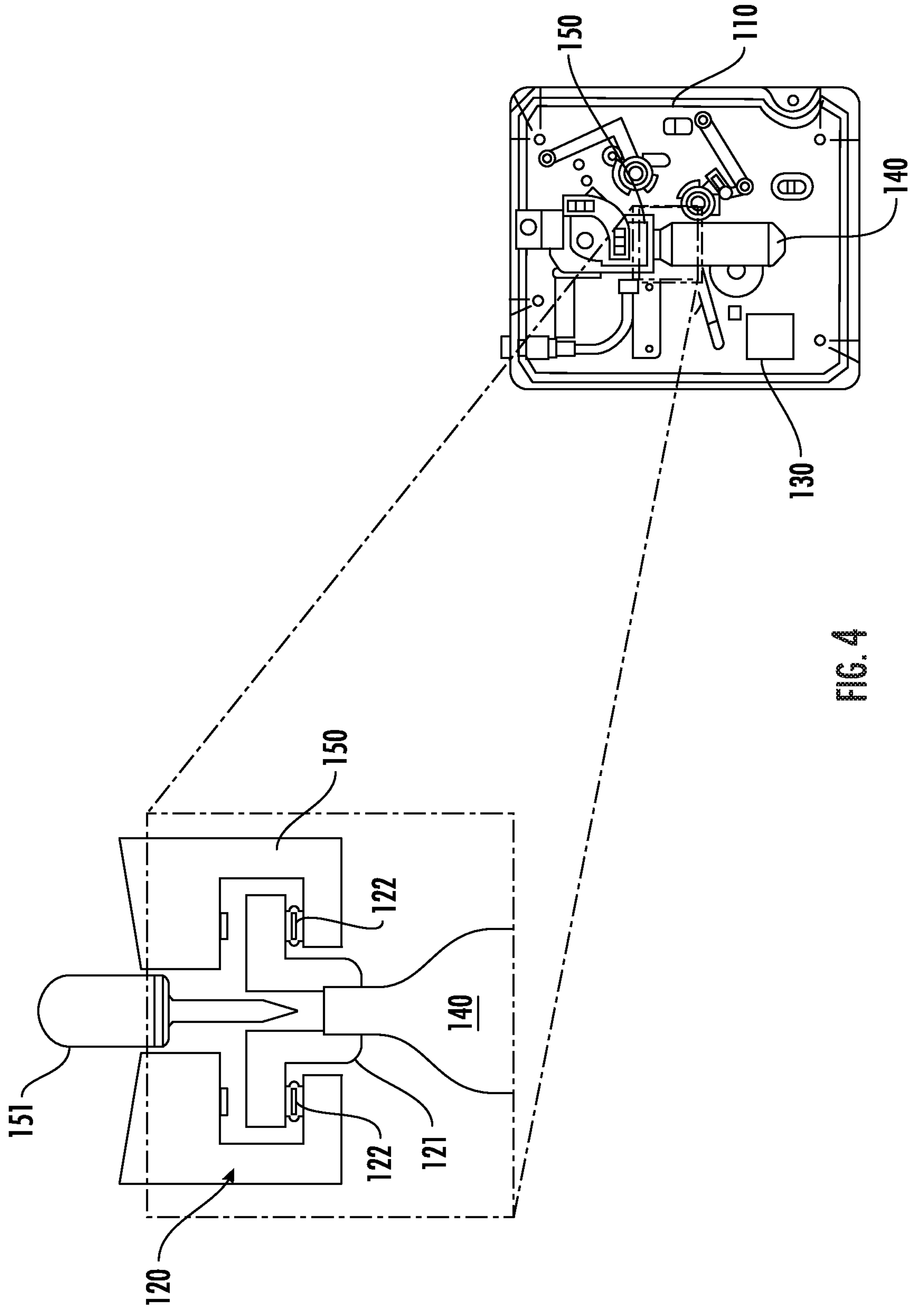
FIG. 4 is a perspective view of a cartridge monitoring assembly in accordance with one aspect of the disclosure.

With reference now to the Figures, a fire suppression system 100 is schematically shown in FIG. 1, which incorporates a cartridge monitoring assembly 120, shown in FIGS. 2-4, within the control box 110. As shown in FIG. 1, the fire suppression system 100 may be used in commercial cooking applications. Within the control box 110, the fire suppression system 100 includes a cartridge 140 for holding a pressurized gas, the cartridge 140 operatively connected to a valve 150. The cartridge monitoring assembly 120 is connected to the cartridge 140. The cartridge monitoring assembly 120 includes a support bracket 121 for securing the cartridge 140 to the monitoring assembly 120, and at least one weight sensor 122 for detecting the weight of the cartridge 140.

In certain instances, the fire suppression system 100 further includes a controller 130 to trigger a communication of a trouble condition when the monitoring assembly 120 detects a weight variance greater than a threshold. This threshold may be determined based upon a minimum amount of pressurized gas typically needed to actuate the valve 150. The threshold amount may be more than the actual minimum due to variability. The cartridge 140 may contain pressurized gas, such as, for example, nitrogen or carbon dioxide. The fire suppression system 100 may additionally include a cylinder 160 for holding a fire suppression agent. The fire suppression agent within the cylinder 160 may, in certain instances, be sodium bicarbonate, potassium bicarbonate, or monoammonium phosphate. When actuated by the cartridge 140, the fire suppression agent is able to be released from the cylinder 160.

To release the pressurized gas from the cartridge 140 and actuate the fire suppression system 100, the cartridge 140, cartridge monitoring assembly 120, and valve 150 are configured appropriately. In certain instances, the support bracket 121 of the monitoring assembly 120 is in contact with the at least one weight sensor 122. In certain instances, the at least one sensor 122 is in contact with the valve 150. In certain instances, the valve 150 includes a piercing pin 151 to release the pressurized gas from the cartridge 140. The piercing pin 151 is, in certain instances, positioned approximately central to the support bracket 121.

Various exemplary embodiments of the cartridge monitoring assembly 120 are shown in FIG. 2, FIG. 3, and FIG. 4. As shown in FIG. 2 and FIG. 4, the valve 150 and the cartridge 140 may be vertically oriented. In certain instances, as shown in FIG. 2, the cartridge 140 may be positioned above the valve 150. In certain instances, as shown in FIG. 4, the cartridge 140 may be positioned below the valve 150. As shown in FIG. 3, the valve 150 and the cartridge 140 may be horizontally oriented.

In various instances, at least one weight sensor 122 is positioned to detect a change in the weight (i.e. weight variance) of the cartridge 140. When the cartridge 140 is positioned above the valve 150, as shown in FIG. 2, at least one weight sensor 122 is, in certain instances, positioned below the support bracket 121 of the monitoring assembly 120. When the cartridge 140 is positioned below the valve 150, as shown in FIG. 4, at least one weight sensor 122 is, in certain instances, positioned below the support bracket 121 of the monitoring assembly 120. When the cartridge 140 and the valve 150 are horizontally oriented, as shown in FIG. 3, at least one weight sensor 122 is, in certain instances, positioned toward the piercing pin 151 in contact with the support bracket 121. At least one weight sensor 122 is positioned to obtain an accurate weight variance reading when present.

In various instances, a single weight sensor 122 may be used to monitor the weight of the cartridge 140. Using a single weight sensor 122 may help to reduce the overall cost and/or the complexity of the monitoring assembly 120. When detecting a change in the weight of a cartridge 140 positioned above the valve 150, as shown in FIG. 2, or below the valve 150, as shown in FIG. 4, a single weight sensor 122 may, in certain instances, be used between the support bracket 121 and the valve 150. The single weight sensor 122 may indicate a need for replacement of the cartridge 140 when the force exerted by the cartridge 140 is less than the force exerted by a fully pressurized cartridge 140. A fully pressurized cartridge 140 is heavier than a partially pressurized or empty cartridge 140. The heavier the cartridge 140, the greater the downward force exerted by the cartridge 140 on the sensor 122.

When detecting a change in the weight of a cartridge 140 where the cartridge 140 and the valve 150 are horizontally oriented, as shown in FIG. 3, a single weight sensor 122 may be used either on the upper or lower side between the support bracket 121 and the valve 150. When positioned on the upper side between the support bracket 121 and the valve 150, toward the piercing pin 151, the single weight sensor 122 may indicate a need for replacement of the cartridge 140 when the force exerted by the cartridge 140 is greater than the force exerted by a fully pressurized cartridge 140. A partially pressurized or empty cartridge 140 produces less downward force than a fully pressurized cartridge 140. With less downward force pulling the support bracket 121 away from the sensor 122, a higher force will be exerted on the sensor 122 when the cartridge 140 is partially pressurized or empty.

When positioned on the lower side between the support bracket 121 and the valve 150, toward the piercing pin 151, the single weight sensor 122 may indicate a need for replacement of the cartridge 140 when the force exerted by the cartridge 140 is less than the force exerted by a fully pressurized cartridge 140. A partially pressurized or empty cartridge 140 produces less downward force than a fully pressurized cartridge 140. With less downward force pushing the support bracket 121 toward the sensor 122, a lower force will be exerted on the sensor 122 when the cartridge 140 is partially pressurized or empty.

Although described individually above, the monitoring assembly 120 may include both the weight sensor 122 on the upper side and the weight sensor 122 on the lower side when the cartridge 140 and the valve 150 horizontally oriented. The weight sensor 122 on the upper side may receive an increase in force when the cartridge 140 is in need of replacement. The weight sensor 122 on the lower side may receive a decrease in force when the cartridge 140 is in need of replacement.

Regardless of the orientation or the number of weight sensors used, the cartridge monitoring assembly 120 includes a support bracket 121 to secure the cartridge 140 containing a pressurized gas to the cartridge monitoring assembly 120. The cartridge monitoring assembly 120 may be used for any pressurized gas triggering device. A pressurized gas triggering device may include any device which uses a disposable cartridge 140. An example of a pressurized gas triggering device is the actuation mechanism of a fire suppression system 100. Although the cartridge monitoring assembly 120 is capable of being used within any pressurized gas triggering device, for purposes of clarity and brevity, the cartridge monitoring assembly 120 has only been depicted within a fire suppression system 100.

The cartridge monitoring assembly 120 detects the weight of the cartridge 140 using at least one weight sensor 122. At least one weight sensor 122 may, in certain instances, include at least one electrical weight sensor 122 in contact with the support bracket 121 of the monitoring assembly 120. At least one weight sensor 122 may, in certain instances, include at least one mechanical weight sensor 122 in contact with the support bracket 121 of the monitoring assembly 120.

At least one weight sensor 122 may include at least one of a spiral spring, a cantilever, a helical coil, a strain gauge, and a load cell. Each of these may be incorporated by the cartridge monitoring assembly 120 to measure the compressive force exerted by the cartridge 140. The compressive force exerted by the cartridge 140 correlates to the weight of the cartridge 140. The strain gauge and load cell may, for example, be used to convert the compressive force to an electrical signal. The strain gauge and load cell may, in certain instances, be communicatively connected with the controller 130. The spiral spring, cantilever, and helical coil may, for example, be designed to displace a certain amount based on the amount of compressive force being exerted. The spiral spring, cantilever, and helical coil may, in certain instances, be communicatively connected with the controller 130. Regardless of the type of sensor, the controller 130 may trigger a communication when the compressive force indicates a weight variance greater than the threshold.

In certain instances, the at least one weight sensor 122 is in contact with a valve 150, the valve 150 including a piercing pin 151 positioned approximately central to the support bracket 121, the valve 150 configured to release the pressurized gas when activated. When including a piercing pin 151, the valve 150 releases pressurized gas from the cartridge 140 by piercing the seal of the cartridge 140.

When activated, the piercing pin 151 punctures the seal covering the exit of the cartridge 140, which allows the pressurized gas to actuate the fire suppression system 100. In certain instances, the cartridge monitoring assembly 120 enables the continuous monitoring of the weight of the cartridge 140, to ensure that the cartridge 140 contains enough pressurized gas to actuate the fire suppression system 100. To provide continuous monitoring, the monitoring assembly 120 may, in certain instances, take measurements constantly. In various instances, the cartridge monitoring assembly 120 may take measurements periodically, for example within every hour. The way in which the cartridge monitoring assembly 120 measures the weight, rather than the pressure, enables the cartridge 140 to remain sealed, thus avoiding the introduction of any additional potential leak paths.

Figure 5:
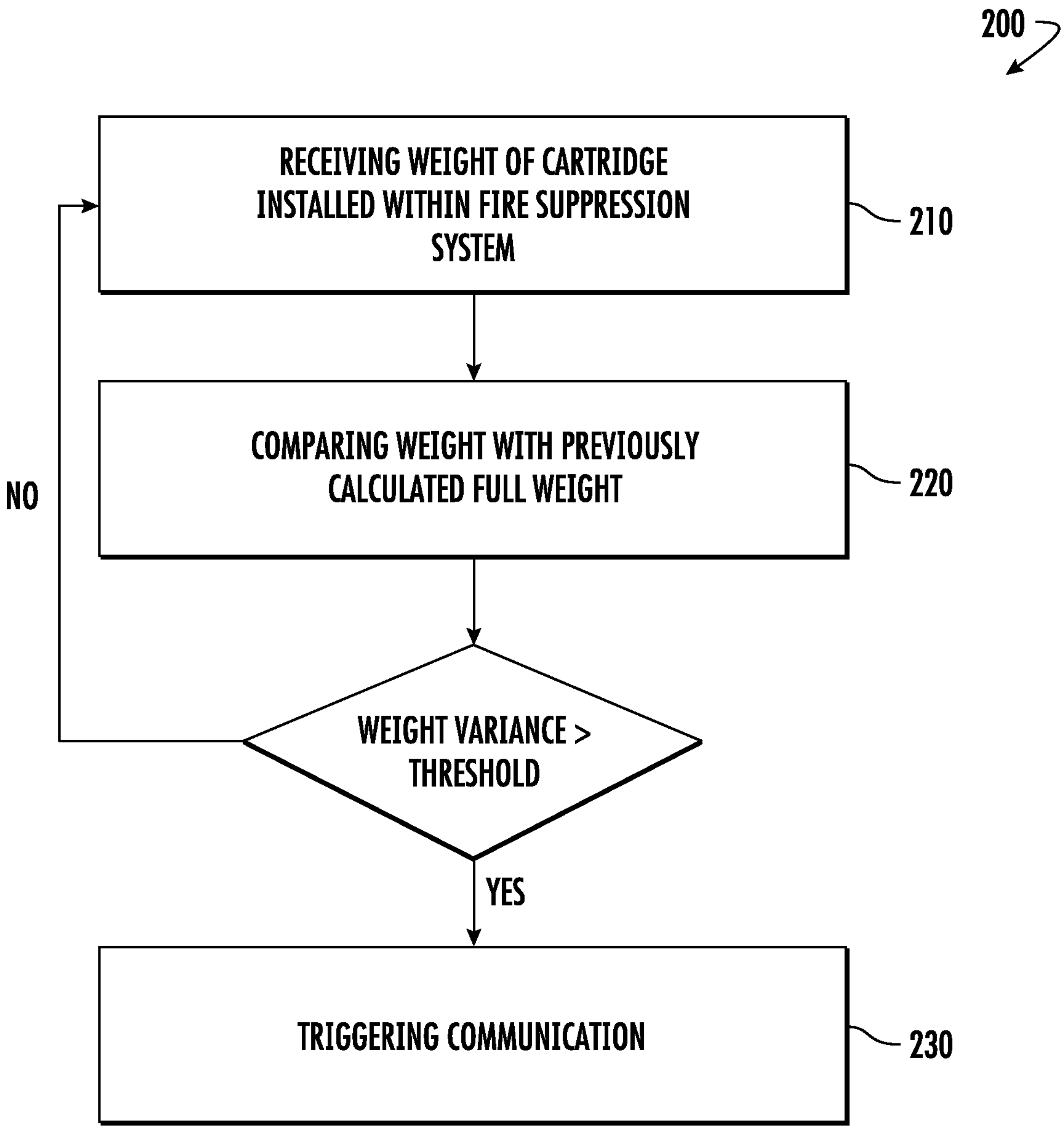
FIG. 5 is a flow diagram illustrating a method of detecting a weight of a cartridge installed within a fire suppression system in accordance with one aspect of the disclosure.

The method of detecting a weight of a cartridge 140 installed within a fire suppression system 100 is illustrated in FIG. 5. In certain instances, this method is performed in the controller 130. As shown in FIG. 5, the method 200 includes step 210 of receiving from a monitoring assembly 120, at a controller 130, a weight of a cartridge 140 installed within the fire suppression system 100, the cartridge 140 holding a pressurized gas. The method 200 further includes step 220 of comparing the weight of the cartridge 140 with a previously calculated full weight value to determine a weight variance of the cartridge 140. The previously calculated full weight value may, in certain instances, be based on several measurements typically provided by a cartridge manufacturer. The previously calculated full weight value may, in certain instances, be set using a "zero-ing" or "tare-ing" method. For example, the "zero-ing" or "tare-ing" method may set the previously calculated full weight value to "0". The comparison step 220, when using a "zero-ing" or "tare-ing" method, compares the measured weight against the "zeroed" previously calculated full weight value. The weight variance (i.e. difference between "zeroed" value and current measurement) will increase (i.e. absolute value) if the cartridge 140 loses weight.

The method further includes step 230 of triggering a communication, with the controller 130, when the weight variance of the cartridge 140 is greater than a threshold. This threshold may, in certain instances, be between two (2) and thirty (30) grams. For example, the threshold may be selected between various ranges between two (2) and thirty (30) grams. In certain instances, the threshold is between two (2) and five (55) grams, between two (2) and ten (10) grams, between two (2) and fifteen (15) grams, between two (2) and twenty (20) grams, between two (2) and twenty-five (25) grams, between five (55) and ten (10) grams, between five (55) and fifteen (15) grams, between five (55) and twenty (20) grams, between five (55) and twenty-five (25) grams, between five (55) and thirty (30) grams, between ten (10) and fifteen (15) grams, between ten (10) and twenty (20) grams, between ten (10) and twenty-five (25) grams, between ten (10) and thirty (30) grams, between fifteen (15) and twenty (20) grams, between fifteen (15) and twenty-five (25) grams, between fifteen (15) and thirty (30) grams, between twenty (20) and twenty-five (25) grams, between twenty (20) and thirty (30) grams, or between twenty-five (25) and thirty (30) grams. For example, in certain instances, a fully pressurized cartridge weighs 250 grams where empty the cartridge weighs 220 grams. In this example, the threshold may be selected as a value between the difference in the two weights (ex. between a minimum threshold value and less than thirty (30) grams). In certain instances, the minimum threshold value is two (2) grams.

The threshold is set to ensure that the cartridge 140 is capable of actuating the fire suppression system 100. For example, the threshold may be determined based upon a minimum amount of pressurized gas needed to actuate the valve 150. In certain instances, the monitoring assembly 120 is capable of detecting a weight variance caused, at least in part, by a leak of the pressurized gas from within the cartridge 140.

In certain instances, the method further includes sending the communication to a panel, where the panel is configured to initiate an alarm. The alarm initiated by the panel (not shown), may include at least one of an audible alarm signal, a visual indicator, or a digital alarm signal. In certain instances, the alarm comprises more than one alarm signal. For example the alarm signal may include a combination of an audible alarm signal with a visual indicator, an audible alarm signal with a digital alarm signal, a visual indicator with a digital alarm signal, or all three (audible, visual, and digital) alarm signals. In certain instances, the alarm is part of an online system capable of indicating a need to replace a cartridge 140 on at least one screen (ex. a screen of a cell phone and/or a computer screen). In various instances, the online system displays the current weight of the cartridge 140 installed within the fire suppression system 100 and/or whether or not the cartridge 140 installed within the fire suppression system 100 is in need of replacement.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fire suppression system, comprising:

a cartridge for holding a pressurized gas, the cartridge operatively connected to a valve;

a monitoring assembly connected to the cartridge, the monitoring assembly comprising:

a support bracket for securing the cartridge to the monitoring assembly; and at least one weight sensor for detecting a weight of the cartridge; and a controller to trigger a communication of a trouble condition when the monitoring assembly detects a weight variance greater than a threshold.

2. The fire suppression system of claim 1, wherein the threshold is determined based upon a minimum amount of pressurized gas needed to actuate the valve.

3. The fire suppression system of claim 1, wherein the fire suppression system further comprises a cylinder for holding a fire suppression agent.

4. The fire suppression system of claim 1, wherein the support bracket is in contact with the at least one weight sensor.

5. The fire suppression system of claim 1, wherein the at least one weight sensor is in contact with the valve.

6. The fire suppression system of claim 5, wherein the valve and the cartridge are vertically oriented, with the cartridge positioned above the valve.

7. The fire suppression system of claim 5, wherein the valve and the cartridge are vertically oriented, with the cartridge positioned below the valve.

8. The fire suppression system of claim 5, wherein the valve and the cartridge are horizontally oriented.

9. The fire suppression system of claim 1, wherein the valve comprises a piercing pin, the piercing pin positioned approximately central to the support bracket.

10. A cartridge monitoring assembly, comprising:

a support bracket for securing a cartridge containing a pressurized gas to the cartridge monitoring assembly for a pressurized gas triggering device; and at least one weight sensor for detecting a weight of the cartridge, wherein a controller triggers a communication of a trouble condition when the cartridge monitoring assembly detects a weight variance greater than a threshold.

11. The cartridge monitoring assembly of claim 10, wherein the at least one weight sensor comprises at least one electrical weight sensor in contact with the support bracket of the monitoring assembly.

12. The cartridge monitoring assembly of claim 10, wherein the at least one weight sensor comprises at least one mechanical weight sensor connected to the support bracket of the monitoring assembly.

13. The cartridge monitoring assembly of claim 10, wherein the at least one weight sensor comprises at least one of: a spiral spring, a cantilever, a helical coil, a strain gauge, and a load cell.

14. The cartridge monitoring assembly of claim 10, wherein the at least one weight sensor is in contact with a valve, the valve comprising a piercing pin positioned approximately central to the support bracket, the valve configured to release the pressurized gas when activated.

15. A method for detecting a weight of a cartridge installed within a fire suppression system, the method comprising:

receiving from a monitoring assembly, at a controller, a weight of a cartridge installed within the fire suppression system, the cartridge holding a pressurized gas;

comparing the weight of the cartridge with a previously calculated full weight value to determine a weight variance of the cartridge; and triggering a communication, with the controller, when the weight variance of the cartridge is greater than a threshold.

16. The method of claim 15, wherein the threshold is between 2 and 30 grams.

17. The method of claim 15, wherein the threshold is determined based upon a minimum amount of the pressurized gas needed to actuate a valve.

18. The method of claim 15, wherein the weight variance of the cartridge is caused, at least in part, by a leak of the pressurized gas.

19. The method of claim 15, further comprising sending the communication to a panel, the panel configured to initiate an alarm, wherein the alarm comprises at least one of: an audible alarm signal, a visual indicator, and a digital alarm signal.

* * * * *